US006621589B1

(12) United States Patent
Al-Kazily et al.

(10) Patent No.: US 6,621,589 B1
(45) Date of Patent: Sep. 16, 2003

(54) PRINT JOB PROCESSING IN A PRINTER NETWORK USING SELECTED PRINTER ATTRIBUTES

(75) Inventors: Binnur Al-Kazily, Boise, ID (US); Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/405,892

(22) Filed: Sep. 24, 1999

(51) Int. Cl.[7] .............................................. G06K 15/00
(52) U.S. Cl. ........................................ 358/1.15; 358/1.6
(58) Field of Search ........................... 358/1.1, 1.2, 1.6, 358/1.8, 1.13, 1.15, 1.16, 404, 403; 710/8, 10, 13, 14, 16, 72, 73, 74

(56) References Cited

U.S. PATENT DOCUMENTS 5,659,795 A      8/1997   Duvall et al. ................ 395/835

FOREIGN PATENT DOCUMENTS

| EP | 0529818 A2 | 3/1993 | ............ G06F/3/12 |
| EP | 0588513 A2 | 3/1994 | ............ G06F/3/12 |
| EP | 0917043 A2 | 5/1999 | ............ G06F/3/12 |
| EP | 0917044 A2 | 5/1999 | ............ G06F/3/12 |
| WO | WO 92/11596 | 7/1992 | ............ G06F/3/12 |
| WO | WO99/38068 | 7/1999 | ............ G06F/3/12 |

OTHER PUBLICATIONS

UK Search Report (dated Jun. 13, 2001).

Primary Examiner—Arthur G. Evans
(74) Attorney, Agent, or Firm—Leslie G. Murray (57) ABSTRACT

A central print system in which print jobs are directed to a particular print resource based on a set of print job attributes specified by an end user at the time the print job is submitted. The central print system provides intent-based printing which allows the end user to specify the end result of the printing operation rather than initially selecting a print resource. A print job manager processes the print job using the end user selected print job processing attributes to select the appropriate print resource from a group of networked print resources. An attribute registers a set of job processing attributes for each print resource servicing a single print queue and provides a list of available print job attributes to each client computer on the network from which an end user specifies particular job attributes to define a desired end result for a print job. The attribute manager periodically updates the job processing attribute list as print resources are added to or deleted from the network. The central print system may include one or more add-on modules accessible by the print job manager which provide additional functionality to the print system not available in or required to be provided by a print resource.

20 Claims, 7 Drawing Sheets

PRINT JOB PROCESSING IN A PRINTER NETWORK USING SELECTED PRINTER ATTRIBUTES

CROSS-REFERENCE TO RELATED APPLICATION

In copending application Ser. No. 09/405,895, titled "PROVIDING OF PRINT JOB ATTRIBUTES FOR LATER ACCESS BEFORE PRINTING", filed on even date herewith, and assigned to the assignee of the present invention (incorporated herein by this reference), there is described a method of providing print job attributes to a user.

FIELD OF THE INVENTION

The present invention is directed generally to job processing in a network system, and, more particularly, to print job processing wherein a particular printer in a printer network is selected as a function of user selected print job attributes.

BACKGROUND OF THE INVENTION

In the field of computer printing, a print job such as a word processing document consists of printer commands and data that are sent in a single batch from an input device such as a computer to a printing device such as a printer. Printer control commands contain explicit attributes of the print job such as a selected paper size, media type, and priority. Page description language (PDL) instructions contain the data as well as formatting commands such as line width and page separation. The printer control commands are added by the printer driver as required by the print job itself and/or whatever the end user may specify using standardized menus provided by the print application. Software routines stored as firmware, for example, within the printer interpret the print job and print it.

In many computer systems, such as networked systems, a large number of output devices, such as printers, for example, are coupled to one or more host computers. Often printers and other output devices are shared on a network by more than one client or host computer. A client is any input machine, device or computer that sends a job to an output device. When an end user desires to effectuate one or more particular output functions, the end user initiates execution of appropriate commands to cause a particular one of the output devices to complete the desired function or functions.

For example, when it is desired to have one or more print functions performed to produce a desired printed document, an end user has to complete multiple steps in order to initiate the processing of a particular print job in the desired manner. Typically, these steps include, 1) identifying the appropriate printer and printer driver combination that provides the required job attributes, such as duplex or n-up printing, for example, and 2) setting up the host or client application and printer driver to print to the correct print queue for the particular print job to be processed. When many printers are available on a network, it is often necessary for an end user of a print client to choose among several printers when sending a print job to insure that the desired job can be performed.

However, oftentimes, insufficient information is available to the end user to allow the end user to choose an appropriate printer to meet the end user's needs. Oftentimes, only the names of the printers coupled to the host computer and the network are provided to the end user with no additional information concerning the printers' capabilities and attributes being provided. Further, the printer driver doesn't necessarily provide all the necessary job processing attributes an end user may wish to specify for a particular print job, such as printing to the fastest device, or insuring that the appropriate media is available at the device at the time the print job is submitted, for example. These types of information processing may require yet another set of applications that are not necessarily provided within the printer driver. Quite often, the only print job attribute information available to the end user is the generic information provided by an application-specific pull-down menu, such as which pages to print, number of copies, and/or two-sided printing parameters, for example.

In a typical scenario, an end user desiring to submit a print job to effectuate one or more particular print functions must select a particular printer without adequate knowledge concerning the capabilities and attributes of the printers available to the network. Thus, the end user selects a printer which may or may not have the particular capabilities and attributes necessary to produce the desired printed document.

What is needed, therefore, is an improved means for an end user to select printer resources which provides a list of available print job attributes and printer capabilities thereby allowing the end user to specify required printer capabilities and print job attributes to produce a desired printed document.

SUMMARY OF THE INVENTION

In a preferred embodiment, the present invention provides a central print system in which print jobs are directed to a particular print resource based on a set of print job attributes specified by an end user at the time the print job is submitted. Thus the central print system of the invention provides intent-based printing allowing the end user to specify the end result of the printing operation rather than initially selecting a print resource using insufficient information and submitting a print job to a printer which may or may not have the required capabilities and print job attributes to produce the desired printed output.

In another preferred embodiment of the present invention, a central print system having a single print queue is serviced by multiple print resources wherein a set of supported job processing attributes for each print resource is specified. The central print system is embodied in a print job manager and an attribute manager included in a network print server. The attribute manager registers a set of job processing attributes for each print resource servicing the print queue and provides a list of available print job attributes to each client computer on the network from which an end user can specify particular job attributes to define a desired end result for a print job. When an end user submits a print job from the client computer to the print queue, the print job manager, using an algorithm to choose the right set of job processing tools, selects the optimum printer from the available print resources for the print job based on the end user selected print job attributes. Periodically, the attribute manager updates the client computer job processing attribute list, for example, as print resources are added to or deleted from the network. The central print system may include one or more add-on modules accessible by the print job manager which provide additional functionality to the print system not available in or required to be provided by a print resource. For example, an add-on module may be included in the print system which provides necessary page description language (PDL) conversions within the print system, such as converting print data from PostScript (R) to PCL (R).

In a another preferred embodiment, the present invention may be implemented as a method of selecting a printer for processing a print job that utilizes the central print system described above. The method preferably includes selecting one or more job processing attributes from a list of available job processing attributes and submitting a print job together with the selected job processing attributes to the print system print queue. An appropriate printer is then selected as a function of the selected job processing attributes and the print job is transmitted from the print queue to the selected printer. The method may include prioritizing one or more of the selected job processing attributes either at the time the job processing attributes are selected or when the print resource is selected. The method may also include updating the list of available job processing attributes, preferable at the time of each print job request.

Other aspects and advantages of the present invention will become apparent from the following detailed description, taken in conjunction with the accompanying drawings, illustrating by way of example the principles of the invention. The claims alone, not the preceding summary or the following detailed description, define the invention.

BRIEF DESCRIPTION OF THE DRAWINGS

The present invention will be described with reference to the accompanying drawings in which like reference numbers indicate identical or functionally similar elements.

DETAILED DESCRIPTION OF THE INVENTION

As shown in the drawings for the purposes of illustration, the present invention is embodied in a central print system and method which enables an end user to specify a set of print job processing attributes at the time a print job is submitted, and which directs the print job to a particular print resource based on the specified set of print job processing attributes. The central print system of the invention thus provides intent-based printing thereby allowing the end user to specify the end result of the printing operation. In conventional print systems, the end user typically must choose a print resource at the time the print job is submitted. Oftentimes, the end user is provided only with the names of the available print resources and little or no additional information concerning capabilities of the print resources resulting in a print job being submitted to a printer which may or may not have the required capabilities and job processing attributes to produce the desired printed output.

Figure 1:
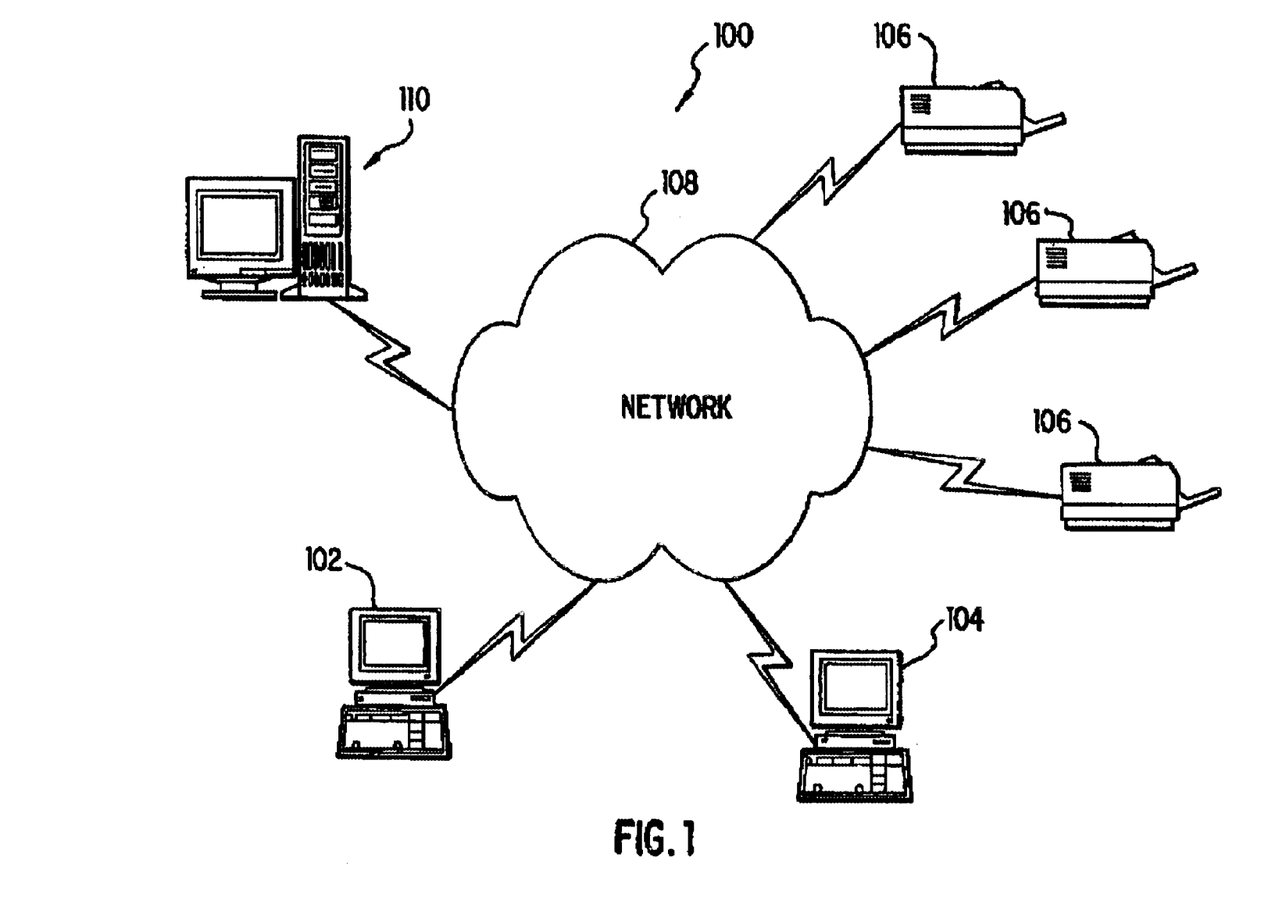
FIG. 1 is a simplified diagram of a network system for performing the method of the present invention.

Referring now to FIG. 1, an exemplary network system 100 in which the invention can be used is shown. Generally, the network system 100 of FIG. 1 includes multiple (n) client (host) computers 102 and 104 and one or more networked devices illustrated as printers 106. The client computers 102 and 104 communicate with the printers 106 over a data communications network 108. As presented herein, host computers 102 and 104 are each intended to represent any of a broad category of computing devices including, but not limited to, a business or personal computer, a server, a network device, a settop box, a communication device, and the like. It should be appreciated that host computers 102 and 104 require no special features or attributes to take advantage of the innovative features of central print system of the present invention. In most implementations, host computers 102 and 104 include a display device and an input device, such as a keyboard and/or mouse, for example, wherein the central print system may provide a visual user interface, such as a pull-down menu, for example, when invoked by an end user for the purpose of specifying print job processing attributes. In the illustrated example, the data communications network 108 can include one or more of: the Internet, PSTN networks, local area networks (LANs), and private wide area networks (WANs). Communication between client computers 102, 104 and printers 106 can be via any of a variety of conventional communication protocols. Client computers 102, 104 transfer data or jobs to printers 106 via network 108. One or more servers 110 may also be coupled to communications network 108. The printers 106 of FIG. 1 can be any of a wide variety of conventional printing or other output devices. Such output devices can be physical devices, such as laser printers, inkjet printers, dot matrix printers, facsimile machines or plotters, for example. Typically, in a network such as network system 100 communications between a client computer 102, for example, and a printer 106 will be via one or more printer servers 110.

Figure 2:
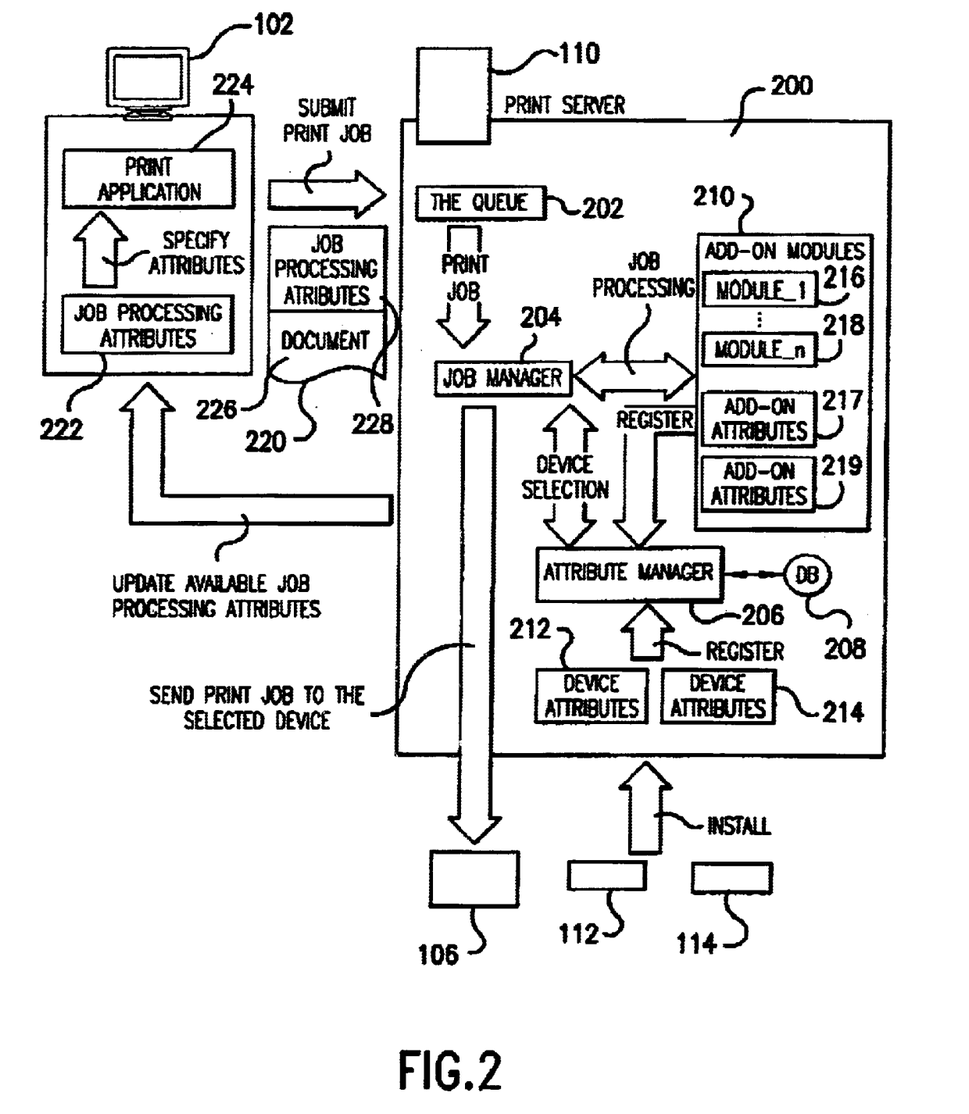
FIG. 2 is a detailed block diagram of a central print system according to the principles of the present invention.

Referring now also to FIG. 2, a computer network including a preferred embodiment of a central print system 200 according to the principles of the present invention is illustrated. In the shown computer network, an operator or end user of client computer 102 submits a print job 220 via print application 224. One portion 228 of the print job 220 comprises job commands including printer control commands and job processing attributes. Another portion 226 of the print job is job data including PDL instructions such as PostScript (R) or PCL (R) instructions that describe the output to the printer, which then uses the instructions to construct text and graphics to create the desired page image. As will be described in more detail below, the central print system 200 of the present invention provides a list 222 of job processing attributes available to the end user on the network. When submitting the print job 220, the end user specifies a desired set of job processing attributes for the print job 220.

In one implementation, the central print system 200 is preferably embodied in a print server 110 and forms a portion of the computer network 100 as shown in FIG. 1. The central print system 200 provides services to one or more host or client computers 102 in the network 100 and is, in turn, serviced by one or more print resources 106 coupled to the network 100. As will be developed more fully below, the central print system 200 collects and displays a set of job processing attributes associated with the network print resources allowing an end user to specify job processing attributes for a print job 200, and processes the print job including selecting a print resource to further process the print job as a function of the user-specified print job processing attributes. The central print system 200 includes a single print queue 202, a print job manager 204 and an attribute manager 206. The print queue 202 receives print jobs 220 submitted by end users and holds the submitted print jobs in order for further processing by the job manager 204. The job manager 204 determines and selects, as a function of user input, the print resource that will best meet the user-specified requirements for the print job 220. The attribute manager 206 manages the set of installed resource attribute files for the network printing resources. The attribute manager 206 includes a database 208 on a storage media wherein resource attribute files associated with the print resources installed on the network are stored and maintained. In certain implementations, the central print system 200 may include add-on modules 210, i.e., applications 216 and 218 implemented in software, firmware or hardware, providing additional job processing functions not available or necessarily required to be implemented in a print resource. The various print job processing attributes provided by the add-on modules 210 may be invoked by the job manager 204 as required by the user-specified job processing attributes prior to sending the print job to a selected print resource.

As introduced above, the attribute manager 206 manages and maintains the set of installed resource attribute files. The attribute manager 206 also provides a set of interfaces for the job manager 204 and the client computer 102 for interaction between the various central print system components and the job manager 204 and between the client computer 102 and the central print system 200. The job manager 204 utilizes these interfaces to identify the job processing attributes associated with the various print resources 106 available on the print network and to determine how a particular print resource associated with a set of selected job processing attributes can be assessed. The job manager 204 also utilizes the interface with the attribute manager 206 to determine the appropriate priority to assign to each of the job processing attributes to achieve the end user desired results and optimally utilize the available print resources.

The attribute manager 206 also manages the installation and registration of print resources and add-on modules with the central print system. Installation of a print resource or other device, printers 112 and 114, for example, is accomplished at initial startup of the system and typically includes identifying and making the device available for use and providing the device address. A resource attribute file 212 and 214 for each installed device 112 and 114, respectively, is provided to the central print system and registered with the attribute manager 206. The resource attribute file provides information about the job processing attributes associated with a particular print resource which is required by the job manager 206. Similarly, each add-on module 216 and 218 has an attribute file 217 and 219, respectively, providing information about its associated job processing attributes which is registered with the attribute manager 206. The attribute manager 206 includes database 208 wherein the various device attribute files including the add-on module attribute files are stored in an attribute database. As new devices, i.e., print resources, and add-on modules, are added to the system/network, the associated attribute files are added to the database 208. Similarly, as devices or add-on modules are removed from the system/network, the associated attribute files are deleted from the database 208. Each attribute file 212 and 214, for example, identifies all job processing attributes for its associated print resource and provides additional information required by the job manager 204 to process print jobs 220 submitted by an end user. Such information includes, for example, whether a particular job processing attribute is available through hardware, i.e., a printer, for example, or through software add-on modules and how to access the job processing attribute; and whether or not a particular job processing attribute is dependent on one or more other job processing attributes, for example, perform n-up job processing prior to performing duplex printing.

The attribute manager 206 uses the information in the database 208 to compile a list of job processing attributes available to the central print system. The list 222 of job processing attributes is downloaded to the client computer 102 for display to an end user when a print application is invoked. The list may be displayed in a pull-down menu (not shown) or other interactive visual interface to allow the end user to specify selected job processing attributes when submitting a print job. The submitted print job 220 includes the job data 226 and a list of user-specified job processing attributes 228. The attribute manager 206 will update the list 222 of available job processing attributes from time to time, preferably at the time of system startup and initialization and whenever a print resource or add-on module is installed on or deleted from the system/network. In another preferred embodiment, the client computer 102 will invoke the attribute manager 206 to update the list 222 of available job processing attributes prior to submitting each print job or, preferably, whenever a print application 224 is invoked.

As described in more detail below, the job processing attributes list 222 may alternatively comprise a matrix of available job processing attributes compiled by the job manager 204 using the information in the resource attribute files stored in the attribute manager database 208. This job processing attribute matrix is then kept and maintained by the job manager 204 and downloaded to the client computer 102 when requested. Use of a matrix of available job processing attributes provides a more automated process ensuring the end user makes job processing attributes choices which are consistent with the available capabilities of the print network prior to submitting a print job 220 to the central print system 200.

As briefly described above, the job manager 204 manages the processing of a print job 220 to insure that the intent of the end user as defined by the set of specified job processing attributes is achieved. Print job processing by the job manager 204 includes determining which resource available to the central print system will perform which specified job processing attribute and in what order the various job processing attributes will be performed. The end result for the job manager 204 is the selection of the optimal print resource, printer 106, for example, which will ultimately receive the print job 220 and provide the final printed output. In processing the print job 220, the job manager 204 may invoke one or more add-on modules 210 to effectuate certain of the specified job processing attributes prior to sending the print job 220 to the selected print resource. The job manager 204 utilizes the information available from the resource attribute files in the attribute manager database 208 in a predefined algorithm to process a print job in accordance with the end user specified job processing attributes. Additionally, the job manager 204 may add certain job processing attributes to the set of job processing attributes specified by the end user when the print job was submitted to provide further job processing. For example, user name and user physical location can be added by the job manager 204 and used to select an appropriate print resource located physically closest to the end user.

In a preferred embodiment, the job manager 204 utilizes an algorithm implementing a point-based scheme to determine how to effectuate the various specified job processing attributes.

A high-level overview of such an algorithm may include the following rules, for example:

i) in general, hardware supported attributes have greater weight than a software add-on module; for example, if a printer is capable of performing n-up printing, use the printer rather than an add-on module have the same capability;

ii) any job processing attribute that may not be possible to meet, but could be accomplished manually by the end user will have less weight; for example, print to the fastest print even if stapling by the printer is not possible; and iii) assign a priority (i.e., weight) to each attribute; for example, color has greater weight than multiple copies.

The job manager 204 also uses the resource attribute file information available in the attribute manager database 208 to construct a matrix of available job processing attributes for the print system/network which can be downloaded to the client computers 102 and displayed to the end user. One purpose of the matrix, for example, is to allow the client computer 102 to disallow mutually exclusive job processing attributes. For example, do not let the end user select job processing attributes associated with both duplex printing and color if there is no hardware support for color duplex printing among the available network print resources. In another embodiment, the algorithm utilized by the job manager 204 may also implement such an attribute matrix. Preferably, however, the matrix is invoked by the client computer 102 when an end user is selecting a set of job processing attributes to submit a print job.

In another preferred embodiment, the job manager 204 includes logic which provides print queue management as well as print job processing. Rather than a single print queue 202, as described above, the job manager 204 creates a new print queue each time a print job is required to be printed. A print queue for each print job allows the job manager 204 to process each print job immediately as the required print resources become available and thus provide more timely service to the client computer 102 and end user. For example, if both a color printer and a black and white printer are available, then both print jobs may be printed immediately rather than holding a black and white print job in the queue while several color print jobs are ahead of it.

With continuing reference to FIG. 2, the central print system 200 is shown comprising a print queue 202, a job manager 204 coupled to the print queue, an attribute manager 206 coupled to the job manager 204 and including a database 208, and various add-on modules 210 coupled to the job manager 204 and the attribute manager 206. For ease of explanation, each of print queue 202, job manager 204, attribute manager 206 and database 208 and add-on modules 210 are illustrated in FIG. 2 as independent functional blocks. It is to be appreciated, however, that one or more of these functional blocks may well be combined and integrated without deviating from the scope of the present invention. In addition, the central print system 200 and the functional blocks illustrated within FIG. 2 may well be implemented as functional elements of an executable program within software or firmware. Alternatively, certain of the functional blocks shown in FIG. 2, the add-on modules 210, for example, may be physically separate functional blocks, such as hardwired logic or firmware on a plug-in card, and may be distributed throughout the network 100 rather than physically integrated in a single device such as print server 110.

Figure 3:
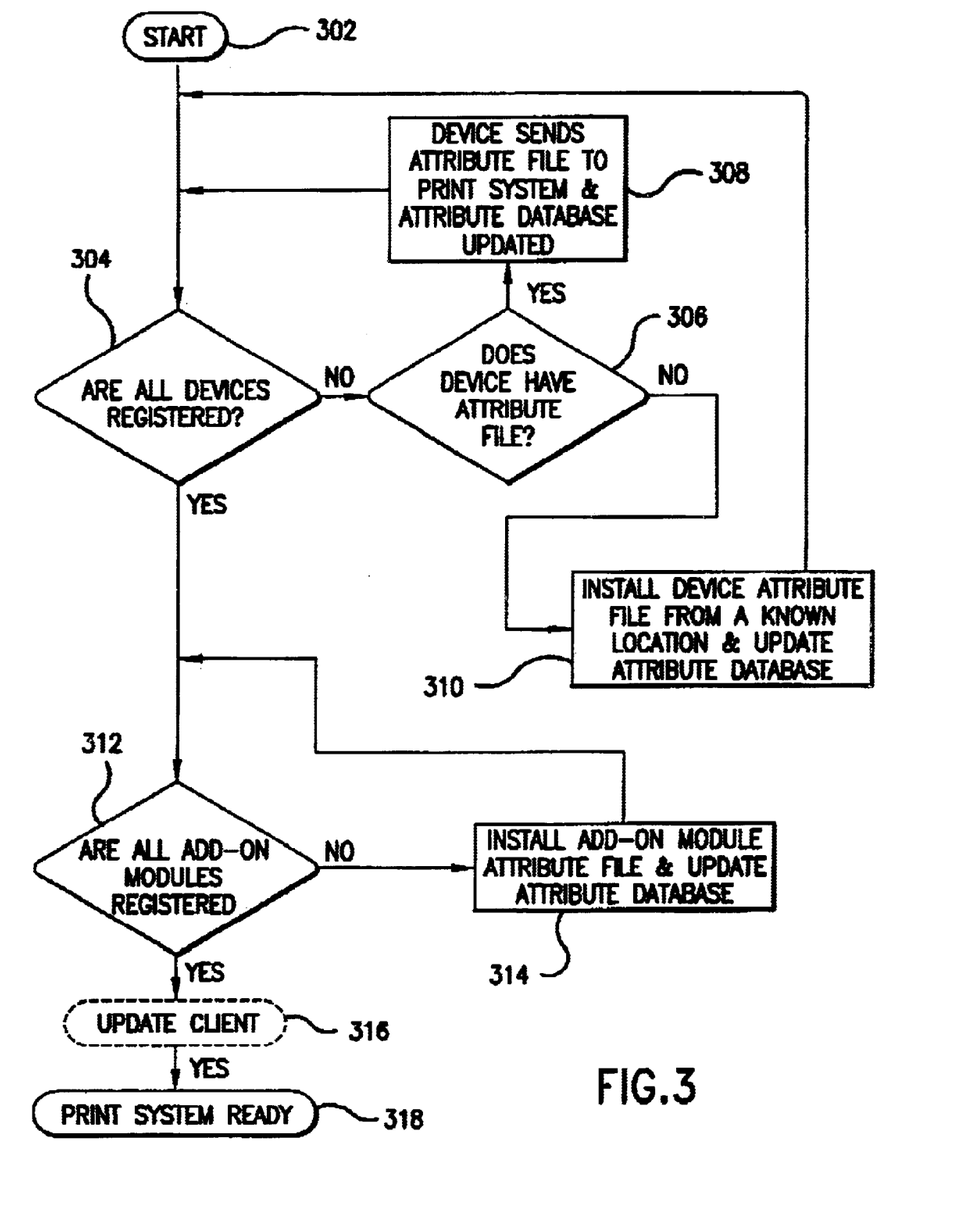
FIG. 3 is a flow chart illustrating initialization of the print server of the central print system of FIG. 2.

FIG. 3 is a flow chart illustrating the startup and initialization of a preferred embodiment of the central print system in accordance with the principles of the present invention. As shown, when the system is initialized (302) the attribute manager 206 queries (304) the network using a discovery protocol to determine if all of the print resources on the network are registered with the central print system. That is, does the attribute manager database 208 have an associated attribute file for each of the print resources on the network. If unregistered devices are identified, each unregistered device is queried (306) to determine if it has an associated attribute file. If the unregistered device has an associated attribute file, the attribute manager 206 downloads (308) the device attribute file and updates the set of attribute files in the database 208. If the unregistered device does not have an associated attribute file which is downloadable, the attribute manager 206 will install the device attribute file from a known location (310) and update the set of attribute files in the database 208. Once all print resources on the network have been registered, the attribute manager 206 queries (312) any add-on modules which have been added to the print system to determine if all add-on modules have been registered. If one or more add-on modules are identified as unregistered, the attribute manager 206 downloads (314) the attribute file associated with each of the unregistered add-on modules and updates the set of attribute files in the attribute manager database 208. Once all add-on modules and all network print resources have been registered and the attribute manager database 208 updated, the central print system is ready (318). In another preferred embodiment, as a step in the initialization process, the attribute manager will automatically update (316) the list 222 of job processing attributes at each of the network client computers 102.

Figure 4:
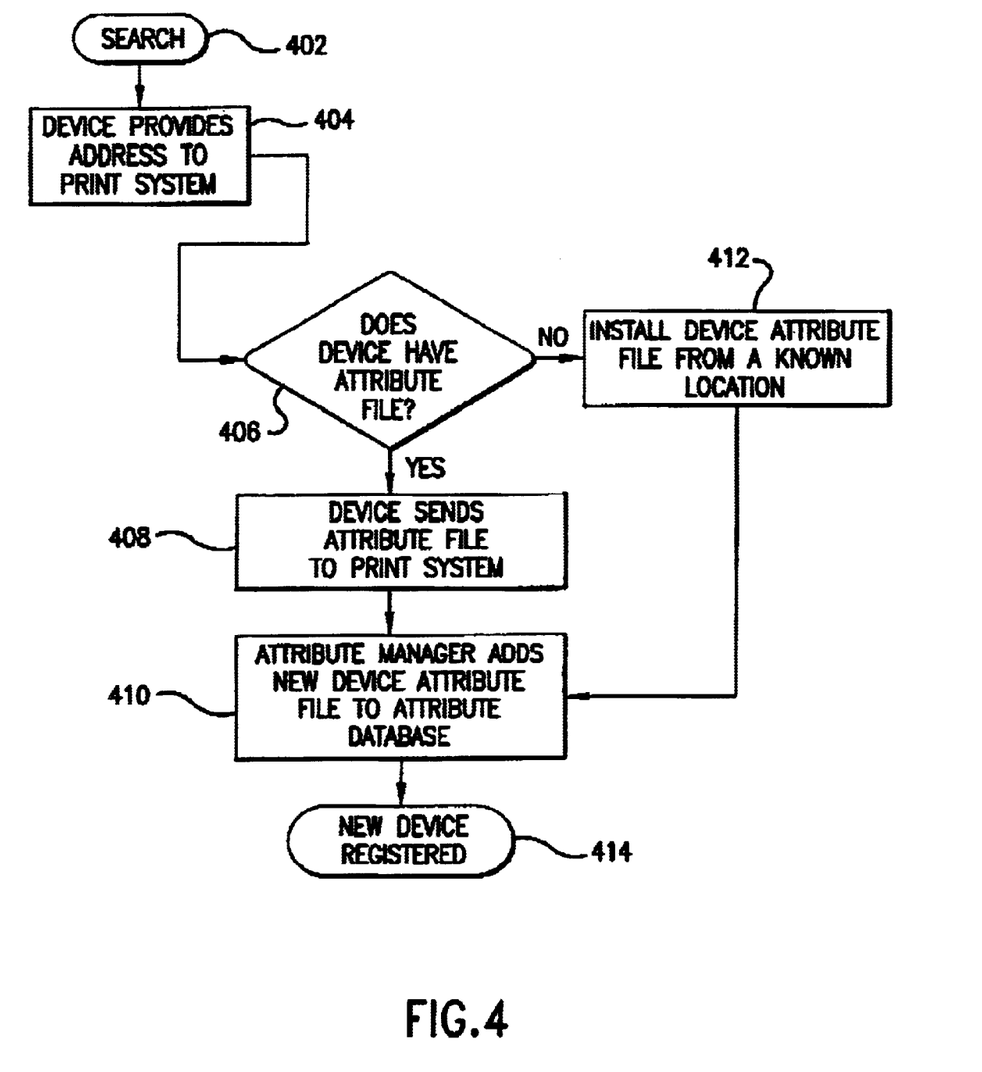
FIG. 4 is a flow chart illustrating the process of adding and registering a new printer resource in the central print system of FIG. 2.

FIG. 4 is a flow chart illustrating a process for updating the central print system 200 when a print resource is added to the computer network 100. At system initialization, as described above with reference to FIG. 3, and on a periodic basis according to predetermined rules, the attribute manager 206 will search (402) the network using a discovery protocol to determine if any new print resources have been installed on the network. When a newly installed and unregistered device is identified, printers 112 and 114, with reference to FIG. 2, for example, the device is prompted for its address (404). The device address is sent to the print server 110 and the attribute manager 206 queries (406) the device to determine if it has an associated attribute file. If the new device has an associated attribute file, the attribute manager 206 downloads (408) the device attribute file and updates (410) the set of attribute files in the database 208. If the new device does not have an associated attribute file which is downloadable, the attribute manager 206 will install the device attribute file from a known location (412) and update (410) the set of attribute files in the database 208 to complete the registration (414) of the newly installed device with the central print system 200 thus making its job processing attributes available to the client computer 102.

Figure 5A:
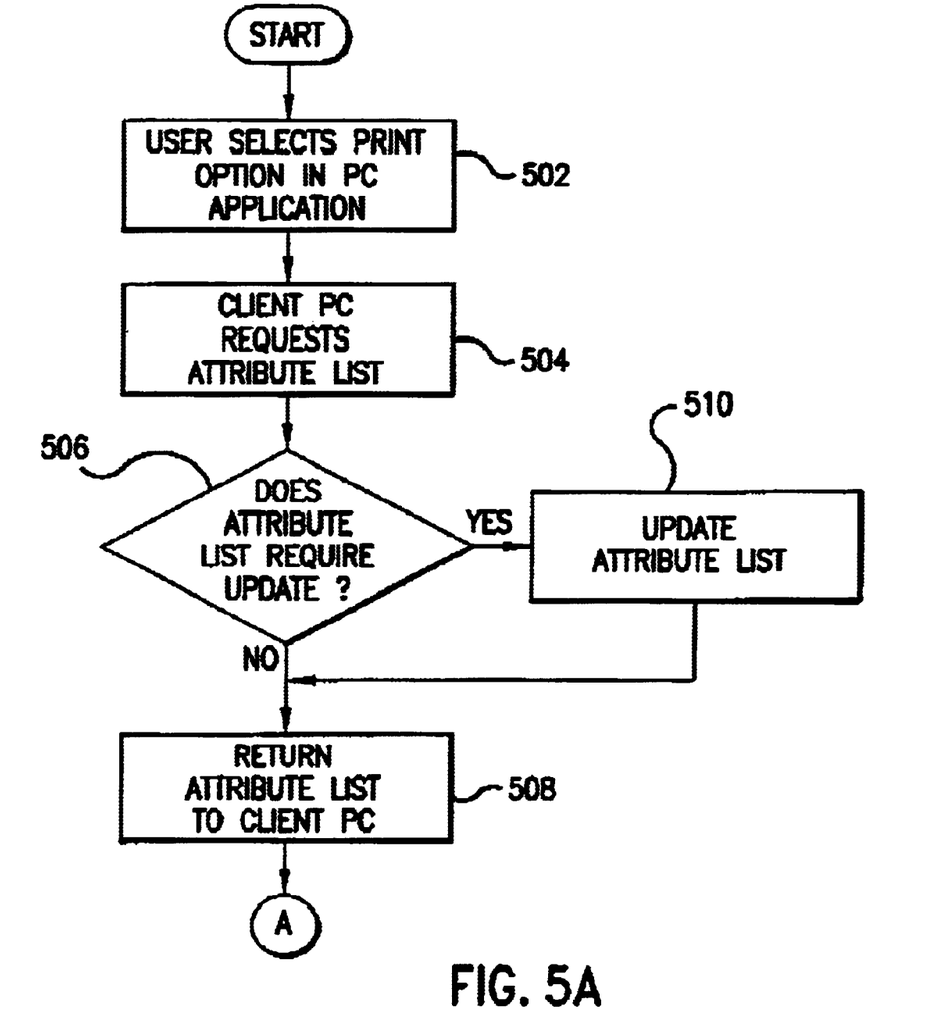
FIGS. 5A, 5B and 5C are flow charts illustrating the printing process in the central print system of FIG. 2.

FIGS. 5A, B and C are a flow chart of the process for printing a print job in accordance with a preferred embodiment of the present invention. When a end user or operator of a client computer 102 desires to submit a print job, the end user will select (502) the print application 224 within whatever application the end user is working in, a word processor, for example. In one preferred embodiment, when the print job submission request is made, the client computer 102 queries (504) job manager 204 for the job processing attributes list 222. The job manager 204 then checks (506) the job processing attributes list to determine if the list requires updating. If the job processing attributes list requires updating, the attribute manager 206 uses the information in the set of resources attribute files in the database 208 to update (510) the job processing attributes list. Alternatively, in one preferred embodiment, the job processing attribute list may be updated by reinitializing the system as described above with reference to FIG. 4. Once the job processing attributes list 222 has been updated and downloaded (508) to the client computer 102, the end user specifies (512) the desired job processing attributes from the list 222 for the print job to be submitted. The end user then selects "print" in the print application 224 to submit (514) the print job. When submitted, the print application, including, for example, an appropriate print driver (not shown), converts (516) the print job to page description language (PDL) and attaches the end user specified job processing attributes and other necessary printer commands and transmits (518) the print job 220 to the print queue 202. The transmitted print job 220 includes the print data 226 in PDL format plus the end user specified job process attributes 228 and other necessary printer commands, such as formatting instructions, added by the print application 224. The print queue 202 then forwards (520) the print job 220 in accordance with a predetermined order to the job manager 204 for job processing. The job manager 204 determines (522) whether or not job processing attributes in addition to those specified by the end user are required. If additional job processing attributes are required, the job manager 204 inserts (524) the required job processing attributes and then identifies any mandatory and dependent attributes (526). If it is determined that no additional job processing attributes are required, the job manager 204 proceeds directly to the identification of the mandatory and dependent attributes. In accordance with a predetermined set of rules the job manager 204 then assigns (528) a priority value to each of the job processing attributes specified for the print job. If one or more of the specified job processing attributes are available (530) through the add-on modules 210, the print job is forwarded (532) to the appropriate add-on module(s) to accomplish the desired job processing as specified. As described above, some job processing attributes may be available both through hardware, i.e., print resources 106, and add-on modules 210. In this case, the priority value assigned to the particular job processing attribute determines whether or not the job process attribute is handled by the add-on module 210 or the print resource 106. Additional, if a particular job processing attribute is available through an add-on module 210, but is also dependent on the prior processing of another job processing attribute, the processing by the add-on module will be deferred until the processing of any such other job processing attribute is complete. For example, a particular print job may include job processing attributes dictating color, duplex and n-up (i.e., "n" pages of the print job printed on a single media page) printing. Both the color and duplex attributes require a printer while the n-up is a software function which may be accomplished by an add-on module 210. In this example, both the color and duplex attributes must be processed, i.e., an appropriate print resource 106 selected, prior to the n-up attribute being processed.

Figure 5B:
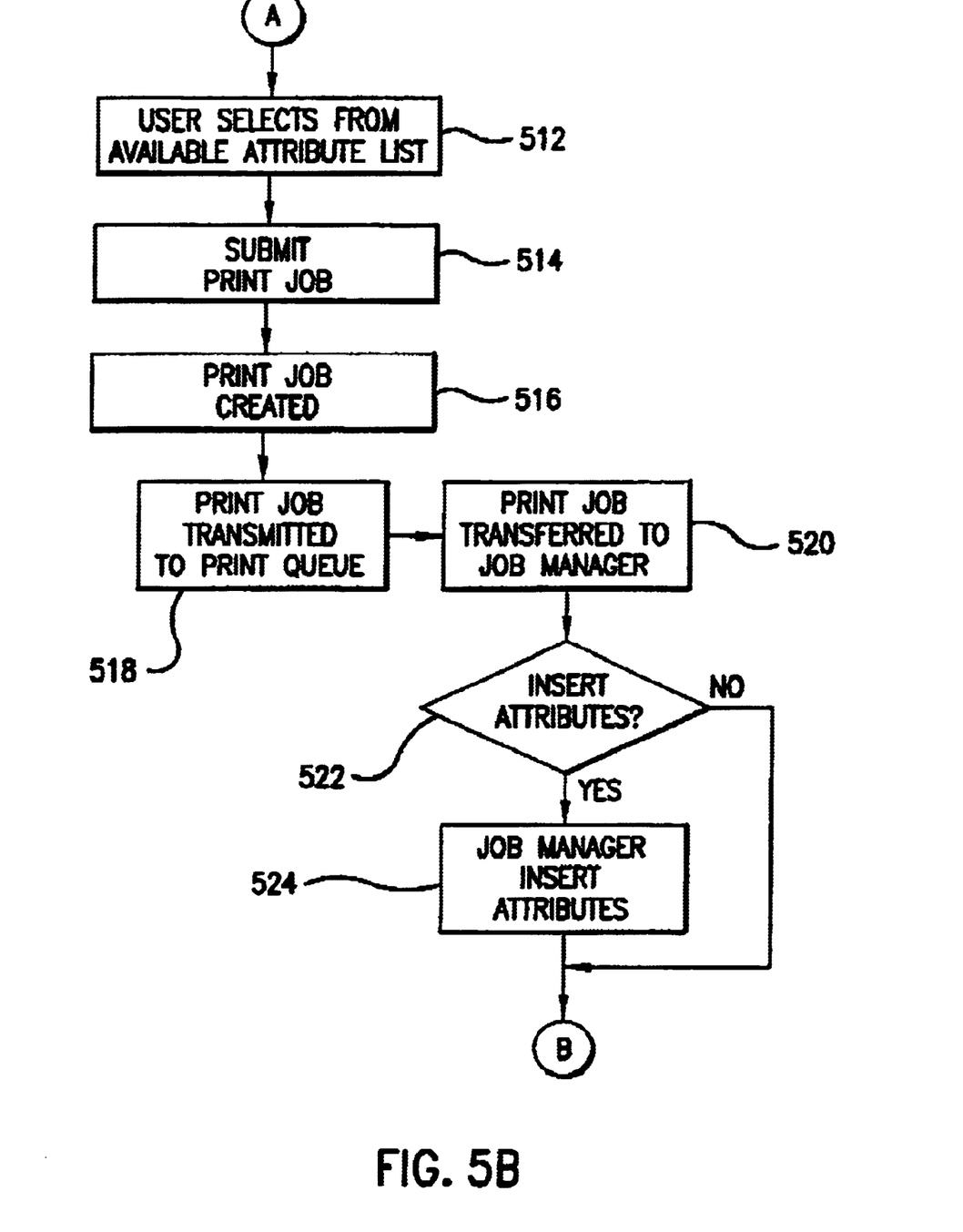
Figure 5C:
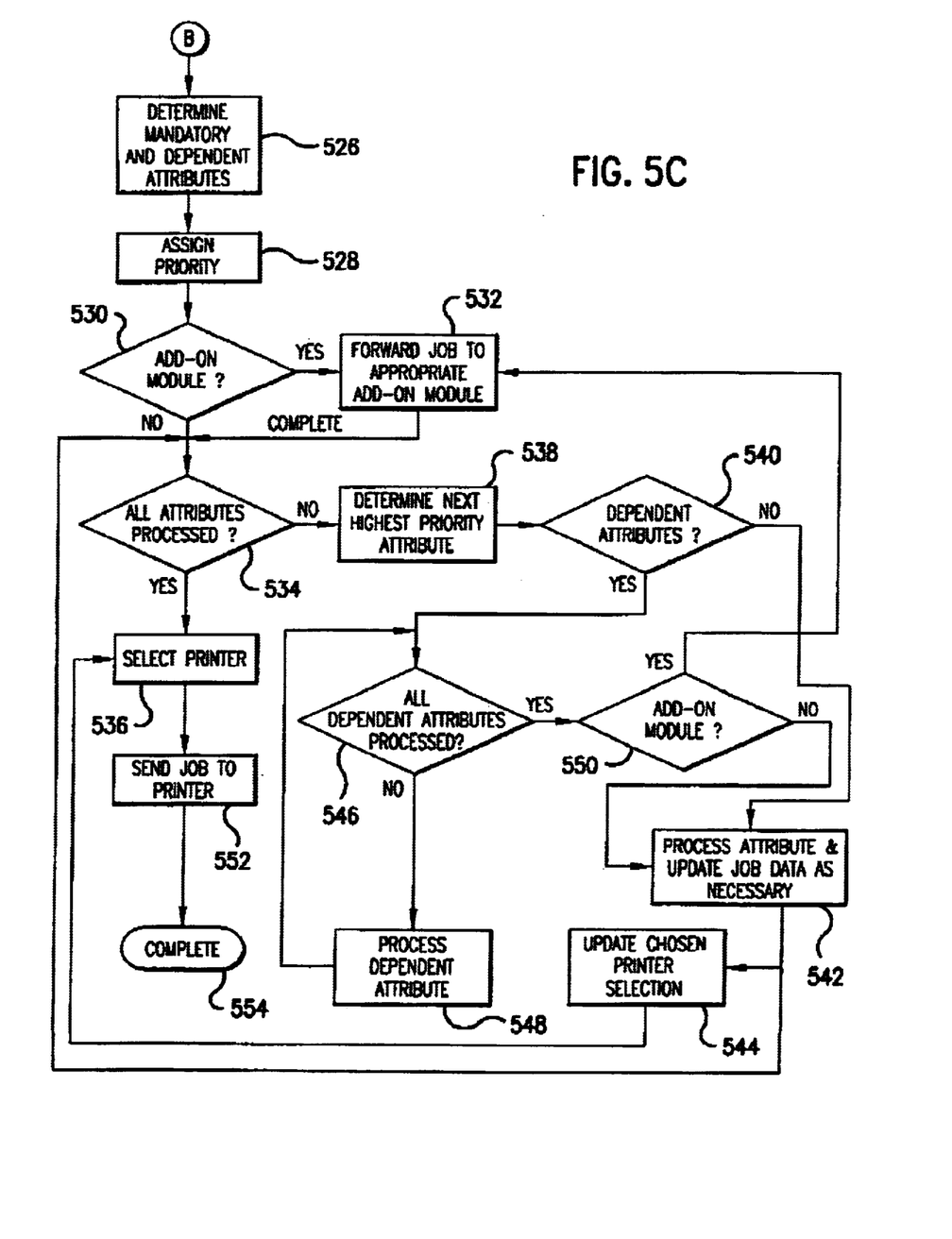

When any add-on module processing is complete, the print job is returned to the job manager 204. The job manager 204 then determines (534) if all of the specified job attributes have been processed. If yes, a print resource 106, a color laser printer, for example, is selected (536). If one or more of the specified job processing attributes remain to be processed (by the job manager 204), then a preliminary print resource selection (536) is made based on the processed job processing attributes. The job manager 204 then processes (538) the remaining unprocessed job processing attributes in order of priority. If the job processing attribute is a non-dependent (540) job processing attribute, it is processed (542) and the print job data is updated (542) and the print resource selection is updated (544) based on the most recently processed job processing attribute. If a job processing attribute is dependent (540) on the earlier processing of another job processing attribute, the job manager 204 determines (546) if all dependency required job processing attributes have been processed. If all dependency required job processing attributes have been processed, and if the dependent job processing attribute is not available through an add-on module 210, the dependent job processing attribute is processed (542) and the print job data and print resource selection is updated (542, 544). If the dependent job processing attribute is available through an add-on module (550), i.e., the processing at step 530 was deferred because of existing dependencies, the print job is forwarded (532) to the appropriate add-on module 210 to complete the desired job processing as specified. If one or more of the dependency required job processing attributes have not been processed, the dependent job processing attribute is deferred until all dependency required job processing attributes are processed (548). When all of the job processing attributes have been processed (534), final print resource selection (536) is made and the print job is transmitted (550) to the selected print resource for completion (552) of the print job.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. A method of selecting a job processing resource for processing a print job in a network having a host computer, a print server, a set of network job processing resources coupled to the print server, and a central print system for processing a print job as a function of user selected job processing attributes, the method comprising the steps of:

registering with the central print system one or more sets of job processing attributes, each set of job processing attributes associated with a different one of one or more job processing resources;

providing a list of available job processing attributes to a user, the user selecting one or more job processing attributes from the list of available job processing attributes;

submitting a print job together with the selected job processing attributes to a print queue;

selecting a job processing resource as a function of the selected job processing attributes; and transmitting the print job from the print queue to the selected printer.

2. The method of claim 1 wherein at least one of the selected job processing attributes is satisfied by one or more add-on modules provided by the central print system.

3. The method of claim 1 wherein the step of selecting job processing attributes includes the step of prioritizing one or more of the selected job processing attributes.

4. The method of claim 1 wherein the step of selecting a job processing resource includes the step of prioritizing one or more of the selected job processing attributes in accordance with a predetermined set of rules.

5. The method of claim 1 wherein the central print system includes a job manager, and wherein the step of selecting a job processing resource includes the step of adding one or more predetermined job processing attributes to the selected job processing attributes prior to selecting the job processing resource.

6. The method of claim 1 wherein the central print system includes an attribute manager, and further including the step of updating the list of job processing attributes in accordance with a set of registered job processing attributes.

7. The method of claim 6 wherein the list of job processing attributes is updated at the time of each print job request.

8. A central print system for processing a print job as a function of user selected job processing attributes in a network having a host computer, a print server and a set of network job processing resources coupled to the print server, the central print system comprising:

a print queue for receiving print jobs submitted by a host computer;

a job manager for processing print jobs received from the print queue in accordance with the user selected job processing attributes; and an attribute manager for registering one or more sets of job processing attributes, each set of job processing attributes associated with a different one of one or more job processing resources.

9. The central print system as in claim 8 wherein the job processing resources include one or more network printers.

10. The central print system as in claim 8 wherein the job manager selects a job processing resource in accordance with at least one of the selected job processing attributes to further process the print job.

11. The central print system as in claim 8 wherein the job processing resources include at least one add-on module providing predetermined job processing functionality accessible by the job manager.

12. The central print system as in claim 11 wherein the job manager selects at least one add-on module in accordance with the selected job processing attributes for processing at least a portion of the print job prior to selection of a job processing resource.

13. The central print system as in claim 8 wherein:

the job processing resources include at least one printer; and the job manager is adapted for prioritizing the selected job processing job attributes in accordance with a set of predetermined rules and for selecting a printer for further print job processing in accordance with at least one of the selected job processing attributes as a function of the priority assigned to the job processing attributes.

14. The central print system as in claim 8 wherein the attribute manager includes storage means for storing and maintaining a database comprising the sets of job processing attributes.

15. The central print system as in claim 14 wherein the attribute manager is adapted for updating the job processing attribute database as job processing resources are added or deleted from the network.

16. The central print system as in claim 8 wherein the attribute manager provides a list of all available job processing attributes to the host computer.

17. The central print system as in claim 16 wherein the list of all available job processing attributes is updated whenever the central print system is initialized.

18. The central print system as in claim 16 wherein the list of all available job processing attributes is updated each time a user initiates submission of a print job.

19. The central print system as in claim 8 wherein the job manager is adapted to provide a matrix of all available job processing attributes to insure user selected job processing attributes are consistent with the job processing capabilities of the network job processing resources.

20. An article of manufacture comprising a program storage medium having computer readable program code means embodied therein for causing the selection of a print resource in a computer network having a host computer, a print server, a set of network print resources coupled to the print server, and a central print system for processing a print job as a function of user selected job processing attributes, in accordance with one or more user specified job processing attributes, the computer readable program code means in the article of manufacture including:

computer readable program code means for causing a computer to register with the central print system one or more sets of job processing attributes, each set of job processing attributes associated with a different one of one or more print resources;

computer readable program code means for causing a computer to provide a list of available job processing attributes associated with one or more print resources available on the computer network;

computer readable program code means for causing the computer to select a print resource from the one or more print resources available on the computer network as a function of at least one of one or more user specified job processing attributes selected form the list of available job processing attributes; and computer readable program code means for causing the computer to transmit a print job associated with the specified job processing attributes from a print queue to the selected print resource.

* * * * *